Figure 1:
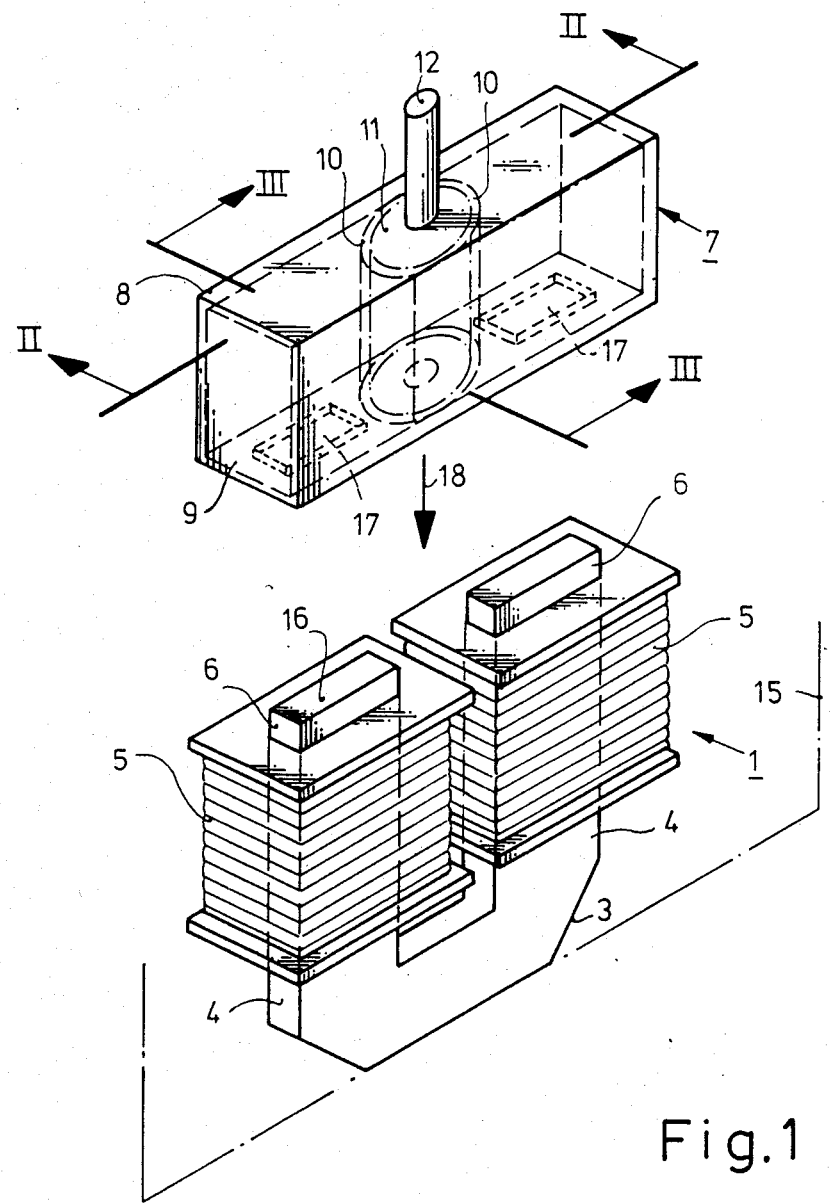

United States Patent [19]

Bertram et al.

[11] Patent Number: 4,684,840
[45] Date of Patent: Aug. 4, 1987

[54] SYNCHRONOUS MOTOR HAVING A PERMANENT-MAGNET MODULAR ROTOR

[75] Inventors: Leo Bertram, Stolberg, Fed. Rep. of Germany; Hugo Schemmann, Schaesberg, Netherlands

[73] Assignee: U.S. Philips Corporation, New York, N.Y.

[21] Appl. No.: 746,215

[22] Filed: Jun. 18, 1985

[30] Foreign Application Priority Data

Jun. 28, 1984 [DE] Fed. Rep. of Germany ....... 3423777

[51] Int. Cl.⁴ ...................... H02K 15/16; H02K 15/14
[52] U.S. Cl. .................................. 310/162; 310/49 R; 310/156; 310/218; 310/254
[58] Field of Search .............. 310/40 MM, 42, 43, 47, 310/50, 89, 156, 162, 217, 218, 254, 261

[56] References Cited

U.S. PATENT DOCUMENTS

| | | | |
|---|---|---|---|
| 3,984,710 | 10/1976 | Poel | 310/162 |
| 4,224,544 | 9/1980 | McKinnon et al. | 310/49 R |
| 4,412,144 | 10/1983 | Denison et al. | 310/156 |
| 4,554,471 | 11/1985 | Bertram et al. | 310/49 R |

*Primary Examiner*—Patrick R. Salce
*Assistant Examiner*—D. L. Rebsch
*Attorney, Agent, or Firm*—David R. Treacy

[57] ABSTRACT

Two-pole single-phase synchronous motor comprising an electromagnetic exciter part and a driving unit. The exciter part comprises a stator member having a longitudinal axis and a pair of stator limbs. Each stator limb has a coil thereon and a free end with an end surface. Each end surface being similarly disposable at various angles relative to the longitudinal axis of the stator member. The driving unit comprises, in combination, a rectangular housing, a permanent-magnetic rotor, and a pair of pole-shoe members. The rotor is rotatably journalled in a bearing imbedded in the housing. The pole-shoe member are contained within the housing. Each pole-shoe member has a pole shoe. The pole shoes enclose the rotor inside the housing. The driving unit forms a separate constructional module which is coupled to the exciter part. Each of the pole-shoe members is mounted on a separate one of the end surfaces so that the orientation of the axis of the rotor of the driving unit relative to the longitudinal axis of the stator member is predetermined by the selected prescribed angle of the end surfaces of the stator member.

16 Claims, 6 Drawing Figures

SYNCHRONOUS MOTOR HAVING A PERMANENT-MAGNET MODULAR ROTOR

The invention relates to a two-pole single-phase synchronous motor comprising a permanent-magnet rotor, a U-shaped stator member whose stator limbs carry coils, and pole-shoe members, which are detachable from the stator member and between whose pole shoes the rotor is mounted for rotation.

Electric motors of this type are known and are used in small electrical appliances, for example citrus-fruit squeezers, can openers and dry-shavers. In DE-OS No. 33 01 263 to which U.S. Pat. No. 4,554,471 (filed by applicants and another) corresponds it is proposed to bend the stator member of such a two-pole single-phase synchronous motor in order to give the rotor axis a specific orientation relative to its central axis. It is also proposed to make those parts of the stator member which comprise the stator poles detachable from the exciter part on which the coils are arranged. However, it is not proposed how to realize a practical construction.

The small dimensions of two-pole single-phase synchronous motors make it possible to meet specific requirements as regards the shape of the handle of the appliance in which the motor is used. This enables different appliance concepts to be realized.

It is the object of the invention to provide a two-pole single-phase synchronous motor of the type specified in the opening paragraph, in which the construction of the detachable part comprising the stator poles is functional and in which the rotor axis can make an arbitrary angle with the center plane of the stator member carrying the coils. Further, the motor should be easy to adapt to specific types of appliance functions.

According to the invention this object is achieved in that the pole-shoe members with the pole-shoes, the rotor and the rotor-bearing means are combined to form a separate constructional unit, constituting a driving part which can be placed on the free ends of the stator limbs of the stator member of the exciter part. Preferably, the independent constructional unit is accommodated in a plastics housing, which is formed by encapsulating the components of said unit.

Thus, the two-pole single-phase synchronous motor comprises two parts, namely the electromagnetic exciter part and the permanent-magnetic driving part. The two arts are assembled separately and are subsequently coupled to each other. This results in a modular system, which enables the driving parts comprising the pole-shoe members, the rotor and the rotor-bearing means to be constructed in such a way that the driving part can be placed on the free ends of the stator limbs at different angles. In a further embodiment of the invention the orientation of the rotor axis relative to the longitudinal axis of the stator limbs can be selected freely, which orientation depends on the construction of the surfaces with which the stator limbs and the pole-shoe members are mounted on each other.

In preferred embodiments the rotor axis extends in the same direction as, or perpendicularly to, the longitudinal axis of the stator limbs. The pole shoes or the free ends of the stator limbs then need not be machined at a specific angle.

In a further embodiment of the invention the pole-shoe members or the stator member are made of sintered iron-alloys. This results in even more possibilities with respect to the shape of the driving part and the motor in general.

In a further embodiment of the invention the permanent-magnetic driving part of the motor, which part comprises the rotor, is integrated in an appliance assembly associated with a motor-driven appliance part, and the electro-magnetic exciter part of the motor forms part of an appliance assembly which constitutes a basic appliance section. In this embodiment a more versatile construction of appliances can be obtained.

In a further embodiment of the invention, adjustable air gaps are formed between the stator limbs and the pole-shoe members, the gap widths being selected so as to obtain a dynamically stable operation of the motor/load system within the operating voltage range. In another embodiment of the invention a partition is arranged between the exciter part and the driving part of the motor, the thickness of the partition in the area between the stator limbs and the pole-shoe members determining the width of the air gaps. Such a partition enables the width of the air gap to be adjusted in a simple manner.

In a further embodiment of the invention, the partition provides a liquid-tight sealing of the exciter part. This allows the driving part to be cleaned with liquids without impairing the electrical safety of the appliance.

In a further embodiment of the invention, the appliance assembly comprises the driving part being a shaver head and the exciter part being the part by which a dry-shaver is held. In this embodiment the shaver head comprising the moving parts can be separately designed in conformity with specific requirements. It is obvious that use of the invention in a dry-shaver is merely an example of an appliance driven by an electric motor, in which a division into functional sections is advantageous.

Figure 2:
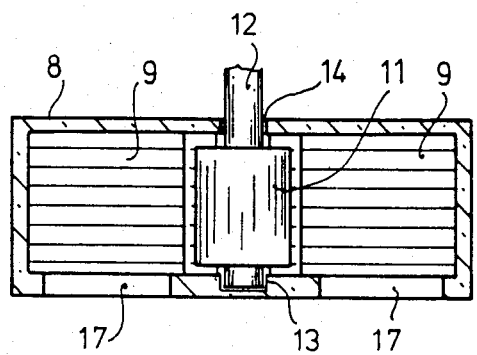
Figures 3, 4:
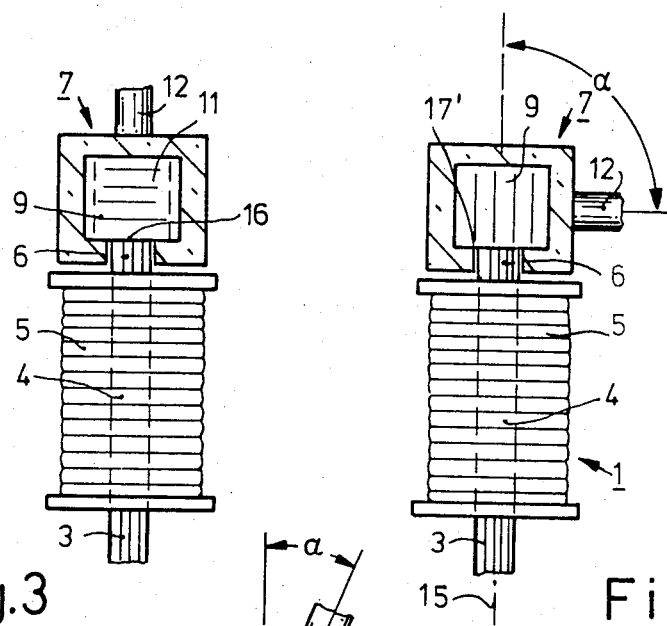
Figure 5:
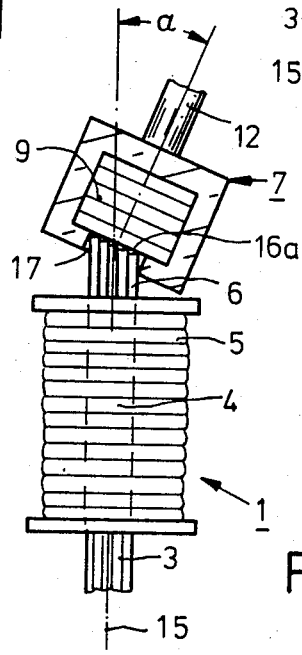
Figure 6:
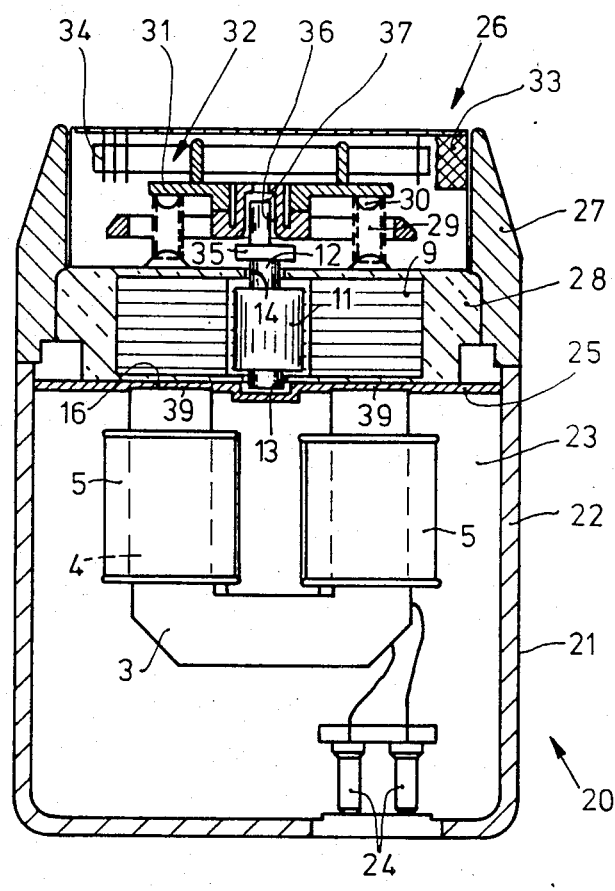

Embodiments of the invention will now be described in more detail, by way of example, with reference to the accompanying drawing. In the drawings:

FIG. 1 shows the electromagnetic exciter part and the permanent-magnetic driving part of a two-pole single-phase synchronous motor with permanent-magnet rotor above each other, the assembly comprising the pole-shoe member and the rotor being a drive section which is ready for operation and merely has to be placed onto the electromagnetic exciter part;

FIG. 2 is a sectional view taken on the line II—II in FIG. 1, showing the assembly comprising the the pole-shoe members and the rotor, FIG. 3 is a sectional view taken on the line III—III in FIG. 1, showing the assembled motor with mounted permanent-magnetic driving parts, the rotor axis extending in the center plane of the stator member, FIG. 4 shows the motor of FIG. 3 but now with the rotor axis extending perpendicularly to the center plane of the stator member, FIG. 5 shows the motor of FIG. 3, but now the rotor axis makes an angle of between 0° and 90° with the center plane of the stator member, and FIG. 6 shows an appliance driven by an electric motor, in which the exciter part and the driving part are each integrated in detachable appliance sections.

The low part of FIG. 1 shows an exciter part 1 of a single-phase synchronous motor, comprising a U-shaped stator member 3 having stator limbs 4 carrying coils 5. The free ends 6 of the stator limbs 4 project from the upper ends of the coils 5.

The upper part of FIG. 1 shows a driving part 7, comprising a plastic encapsulating or housing 8 containing the pole-shoe members 9, whose pole shoes 10 enclose the rotor 11 of the two-pole single-phase synchronous motor. The shaft 12 of the rotor 11 is journalled in bearings 13 and 14 (FIG. 2) in the plastic housing 8.

The stator member 3 is laminated parallel to a center plane 15. The pole-shoe members 9 in the driving unit 7 are laminated parallel to radial planes through the rotor 11. This type of lamination has a special advantage because the laminations of the stator iron 3 consist of stamped-out stacked sheets which, apart from the end surfaces 16 (FIG. 3), need not be machined with special accuracy at the free ends 6 of the stator limbs 4. Laminating the pole-shoe members 9 in the driving unit 7 in the direction of radial planes through the rotor 11 has the advantage that these pole-shoe member laminations may be constituted by simple stamped-out parts, which all have the same shape.

Obviously, lamination is not necessary if the iron parts are made of a sintered material.

FIG. 2, which is a sectional view of the driving unit 7 taken on the lines II—II in FIG. 1, shows how the plastic encapsulation 8 encloses the pole-shoe members 9 and how the rotor bearings 13, 14 are embedded in the plastic encapsulation 8. As shown in FIG. 2, openings 17 are formed in the bottom of the plastic housing 8. At the location of these openings the iron of the pole-shoe members 9 mounting surfaces of the pole member are exposed.

FIG. 3 shows how the driving part 7 is mounted on the free ends 6 of the limbs 4. The magnetism of the permanent-magnet rotor 11 already ensures that the driving unit 7 is firmly attached to the stator member 3. However, since the magnetic attraction alternates when the alternating electric field is applied, it is advantageous to secure the driving unit 7 to the surfaces 16 of the free ends 6 of the stator member 3 by means of an adhesive. FIG. 3 shows the two assembled modular parts of the two-pole single-phase synchronous motor after their assembly as indicated by the arrow 18 in FIG. 1.

FIG. 4 shows a variant of the two-pole single-phase synchronous motor in which the driving unit 7 extends perpendicularly to the direction in FIG. 3. In FIG. 3 the rotor shaft 12 extends in the center plane 15 and in FIG. 4 the rotor shaft 12 extends perpendicularly to the center plane 15. In FIG. 4 the driving unit 7 is formed with openings 17' instead of the openings 17 in FIG. 2, so that the pole-shoe members 9 are again in direct contact with the surfaces 16 of the free ends 6 of the stator limbs 4.

FIG. 5 shows that by an oblique position of the surfaces 16a on the free ends 6 of the limbs the driving unit 7 can be arranged on the electromagnetic exciter part 1 in such a way that the center plane 15 and the rotor shaft 12 enclose an angle α of between 0° and 90° with each other. FIG. 5 shows such an arrangement with an angle α of approximately 20°. It is obvious that this oblique position is particularly favorable if sintered-iron parts are used. The oblique position of the surfaces 16a can be obtained by oblique grinding or by off-setting the laminations relative to each other.

FIG. 6 shows a dry-shaver 20, to illustrate how it is possible to accommodate the exicter part 1 of the motor in a basic appliance section and the driving unit 7 of the motor in an appliance section, associated with the part to be driven.

The basic section, by which the shaver is held, comprises a two-part housing 21, of which only one half 22 is shown from the inner side. The interior 23 of the housing 21 accommodates the exciter part 1 of the two-pole single-phase synchronous motor. The exciter part again comprises a U-shaped stator member 3 comprising stator limbs 4 carrying the coils 5. Via terminals 24 the motor can be connected to, for example, the electric voltage supply. The end surfaces 16 of the stator limbs 4 are adjoined by a partition 25, which separates the interior 23 from the shaver head 26 to obtain, for example, liquid-tight sealing of the electrical exciter part 1. The end surfaces 16 may also partly recede in the partition 25. This depends on how wide the air gap 39 is required to be for dynamic reasons.

The shaver head 26 comprises a shaver-head frame 27, which carries a bridge 28. The bridge 28 replaces the plastic encapsulation 8 of the motor; it accommodates the bearings 13 and 14 of the permanent-magnet rotor 11 and the pole-shoe members 9. Pressure springs 29 bear against the bridge 28. The opposite spring ends 30 press against the lower part 31 of a cutter 32, whose cutter lamellae 34 are urged against an arcuate shear foil 33 from the inside.

The motor shaft 12 carriers a disc 35, which carries an eccentric drive pin 36, which engages in a guide 37 in the lower part 31 of the cutter 32 and causes the cutter 32 to reciprocate when the motor shaft 12 rotates.

When the shaver head 26 is removed from the housing 21 the exciter unit 1 and the driving part 7 of the dry-shaver 20 are also separated from each other.

What is claimed is:

1. A two-pole single-phase synchronous motor comprising an electromagnetic exciter part comprising a stator member having a pair of stator limbs, said stator member having a longitudinal axis, each of said stator limbs having a coil thereon and a free end with an end surface, each of said end surfaces being similarly arranged at a selected prescribed angle relative to said longitudinal axis of said stator member; and a driving unit comprising
a housing,
a permanent-magnet rotor rotatably journalled on its axis in a bearing means in said housing, and
a pair of pole members contained within said housing, each of said members having a pole face and a mounting surface arranged at a given angle with respect to said axis, said pole faces enclosing said rotor inside said housing;

said driving unit being formed as a separate module arranged such that upon placement of said unit on said part, with each of said mounting surfaces abutting a respective one of said end surfaces of said free ends, the orientation of said axis of said rotor within said driving unit relative to said longitudinal axis of said stator member is predetermined by said given angle and the selected prescribed angle of said end surfaces of said free ends of the stator member.

2. A two-pole single-phase synchronous motor as claimed in claim 1, characterized in that said housing is plastic.

3. A two-pole single-phase synchronous motor as claimed in claim 2, characterized in that said members of said driving part comprising said pole faces which are exposed near said free ends of said stator limbs.

4. A two-pole single-phase synchronous motor as claimed in claims 1, 2 or 3, characterized, in that said members, said stator member, or both are made of sintered iron-alloys.

5. A two-pole single-phase synchronous motor as claimed in any of the claims 1, 2 or 3, characterized in that said members of said driving unit are laminated in a direction parallel to radial planes of said axis of said rotor.

6. A two-pole single-hase synchronous motor as claimed in any of the claims 1, 2 or 3, characterized in that said driving unit of said motor, comprising said permanent-magnet rotor, is integrated in an appliance assembly associated with a motor-driven appliance, and said electromagnetic exciter part of said motor forms part of an appliance assembly which constitutes a basic appliance section.

7. A two-pole single-phase synchronous motor as claimed in claim 6, characterized in that adjustable air gas are formed between said stator limbs and said members, said gap widths being selected so as to obtain a dynamically stable operation of the motor load system within the operating voltage range.

8. A two-pole single-phase synchronous motor as claimed in claim 7, characterized in that a partition is arranged between said exciter part and said driving unit of said motor, the thickness of said partition in the area between said stator limbs and said members determining the width of said air gaps.

9. A two-pole single-phase synchronous motor as claimed in claim 8, characterized in that said partition provides a liquid-tight sealing of said exciter part.

10. A two-pole single-phase synchronous motor as claimed in claim 9, characterized in that said appliance assembly comprising said driving part is a shaver head and the appliance assembly comprising the exciter part is the part by which a dry-shaver is held.

11. A two-pole single-phase synchronous motor as claimed in claim 6, characterized in that said appliance assembly comprising said driving part is a shaver head and said appliance assembly comprising said exciter part is the part by which a dry-shaver is held.

12. A two-pole single-phase synchronous motor as claimed in claim 11 characterized in that said members, said stator member, or both are made of sintered iron-alloys, and said partition provides a liquid-tight sealing of said exciter part.

13. A two-pole single-phase synchronous motor as claimed in claim 11, characterized in that said members in said driving unit are laminated in a direction parallel to radial planes of the axis of said rotor.

14. A two-pole single-phase synchronous motor as claimed in claim 13, characterized in that said driving unit of said motor, comprising said permanent-magnet rotor, is integrated in an appliance assembly associated with a motor-driven appliance, and said electromagnetic exciter part of said motor forms part of an appliance assembly which constitutes a basic appliance section.

15. A two-pole single-phase synchronous motor as claimed in claim 14, characterized in that adjustable air gaps are formed between said stator limbs and said members, said gap widths being selected so as to obtain a dynamically stable operation of the motor load system within the operating voltage range.

16. A two-pole single-phase synchronous motor as claimed in claim 15, characterized in that a partition is arranged between said exciter part and said driving unit of said motor, the thickness of the partition in the area between said stator limbs and said members determining the width of said air gaps, and in that said partition provides a liquid-tight sealing of said exciter part.

* * * * *